US008375289B2

(12) United States Patent
Isobe (10) Patent No.: US 8,375,289 B2
(45) Date of Patent: Feb. 12, 2013

(54) DISPLAYING A PREVIEW OF DOCUMENT DATA INCLUDING A REGION IN WHICH AN OBJECT IS INSERTED

(75) Inventor: Naohiro Isobe, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 215 days.

(21) Appl. No.: 12/890,444

(22) Filed: Sep. 24, 2010

(65) Prior Publication Data

US 2011/0099472 A1 Apr. 28, 2011

(30) Foreign Application Priority Data

Oct. 22, 2009 (JP) ................................. 2009-243782

(51) Int. Cl.
*G06F 17/28* (2006.01)
(52) U.S. Cl. ........ 715/226; 715/221; 715/273; 715/274; 715/277
(58) Field of Classification Search .................. 715/226, 715/273, 274, 277, 221
See application file for complete search history.

(56) References Cited

U.S. PATENT DOCUMENTS

| 7,468,805 | B2 | 12/2008 | Lo et al. | |
|---|---|---|---|---|
| 7,596,746 | B2 | 9/2009 | Kobashi et al. | |
| 7,861,261 | B2 * | 12/2010 | Haberman et al. | 725/35 |
| 8,212,834 | B2 * | 7/2012 | Bogart et al. | 345/581 |
| 2005/0168780 | A1 * | 8/2005 | Kobashi et al. | 358/1.18 |
| 2006/0129912 | A1 * | 6/2006 | Kunori | 715/501.1 |
| 2008/0243610 | A1 * | 10/2008 | Ragno et al. | 705/14 |

FOREIGN PATENT DOCUMENTS

| JP | 2005122727 A | 5/2005 |
|---|---|---|
| JP | 2005216183 A | 8/2005 |

* cited by examiner

*Primary Examiner* — Doug Hutton, Jr.
*Assistant Examiner* — Andrew Dyer
(74) *Attorney, Agent, or Firm* — Fitzpatrick, Cella, Harper & Scinto (57) ABSTRACT

An input of document data, in which a rule for retrieving an object from a database has been specified for each region, is received. For each region, the number of times that the database is referenced for retrieving the object is counted by applying the rule. A reference value and each of the counted are compared. For each region, it is determined that the object is to be inserted in the region if the result of the comparison is that the number of times is less than or equal to the reference value, and that the object is not to be inserted in the region if the number of times is greater than the reference value. A preview of the document data is displayed with, for each region, the object being inserted in the region or the object not being inserted in the region in accordance with the determination.

9 Claims, 10 Drawing Sheets

| SURNAME | GIVEN NAME | GENDER | IMAGE 1 |
|---------|-----------|--------|---------|
| Yamada  | Taro      | M      | b-4.pdf |
| Suzuki  | Ichiro    | M      | b-2.pdf |
| Ono     | Yoko      | F      | b-5.pdf |
| Shotoku | Taishi    | M      | b-1.pdf |

FIG. 6B

Text = DB →SURNAME + DB→ GIVEN NAME

FIG. 6C

```
if ( DB → GENDER == "M" ) then
    ImageFileName   = "image_m.jpg"
else  if ( DB → GENDER == "F" ) then
    ImageFileName   = "image_f.jpg"
```

FIG. 6D

ImageFileName = DB → IMAGE 1

FIG. 7

| VARIABLE REGION NUMBER | NUMBER OF TIMES DATABASE IS TO BE REFERENCED RESULTING FROM RULE APPLICATION |
|---|---|
| 303 | 2 |
| 304 | 0 |
| 305 | 1 |

FIG. 9

| COMBINATION NUMBER | CORRESPONDING RECORD NUMBER | | | | |
|---|---|---|---|---|---|
| 1 | 1 | 5 | 10 | 22 | 39 |
| 2 | 2 | 46 | | | |
| 3 | 3 | 14 | 93 | | |
| 4 | 4 | 81 | | | |

| VARIABLE REGION NUMBER | NUMBER OF TIMES DATABASE IS TO BE REFERENCED RESULTING FROM RULE APPLICATION | NUMBER OF PATTERNS RESULTING FROM RULE APPLICATION |
|---|---|---|
| 303 | 2 | - |
| 304 | 0 | 2 |
| 305 | 1 | 300 |

DISPLAYING A PREVIEW OF DOCUMENT DATA INCLUDING A REGION IN WHICH AN OBJECT IS INSERTED

BACKGROUND OF THE INVENTION

1. Field of the Invention

The present invention relates to a document processing apparatus and a preview display method that displays a preview of a document, and a storage medium.

2. Description of the Related Art

In recent years, the Print On Demand (hereinafter, abbreviated as POD) market has been expanding along with the increase in the speed and image quality of electrophotographic and inkjet digital printers. In general, POD is a service for printing electronic data with use of a digital printer, and POD enables performing relatively small-lot print jobs in a shorter turnaround time than when conventional offset printing or the like is used.

With POD, a printing method known as variable data printing (hereinafter, abbreviated as VDP) is performed, which takes advantage of the characteristic that electronic data is used. In VDP, a document is divided into a fixed portion and a variable portion. Data for the variable portion is supplied from a data source such as an RDB (Relational Database) or a CSV (Comma Separated Value) file. Here, a column (field) in the data source is associated with a variable portion in a template document, and data in that column of the data source is applied row-by-row (record-by-record), thus enabling printing slightly different content each time. Using VDP enables creating, for example, direct mail in which the provided product information changes in accordance with customer information. This kind of use method is generally considered to have a higher advertising effect than normal printing, and therefore the use of VDP has been expanding rapidly.

The system for performing variable printing is called a VDP system, and print data in the VDP system is called VDP data. Also, the application that creates VDP data is called a VDP application. The VDP application provides a user with a user interface for performing page layout. In the user interface of a normal print layout application, the user arranges objects that are to actually be printed, such as characters and images. In contrast, with the VDP application, there are cases where these objects change according to a database, and therefore page layout is performed by determining regions where objects are to be disposed (inserted), instead of arranging objects that are to actually be printed. Specifically, these regions include regions where objects that differ according to records in a database are inserted, which are called "variable regions", and regions where the same object for a plurality of records is to be inserted, which are called "fixed regions". Note that "record" refers to one row-worth of data in FIG. 6A, and each record is configured by a plurality of objects.

A rule can be set such that in a variable region, the object to be inserted changes record-by-record in the database. As one example of such a rule, it is possible to set a conditional branch for fields in the database, or the object itself to be inserted can be set for fields. For example, a rule can be set for a variable region such that if the value of an "age" field in a record is from 20 to 29, a photograph image for the range of 20 to 29 is disposed, and if the value is 60 or more, a photograph image for the range of 60 or more is disposed. It is also possible to reference an "address" field and dispose the character string contained therein in a variable region. In this way, the VDP application creates VDP data that associates a database with a variable region on a page.

With the VDP application, the content of the page changes according to the values of the records in the database, and therefore if there is a large number of records in the database, it is not practical to check the layout by previewing the document for all of the records. This is because previewing the document for all of the records would specifically involve the document creator checking a number of images equal to the maximum number of records. For this reason, layout checking has conventionally been performed by checking only the position of the variable region.

However, the layout cannot be sufficiently checked by checking only the positions of variable regions. This is because with this method, although the positions of variable regions can be checked, the actual print content cannot be checked, and therefore it is impossible to make revisions as with the case of performing normal on-site printing. Specifically, it is impossible to check for printed work-related problems such as sentences becoming difficult to read or images becoming not easily viewable due to the combination of sentences, images, and the like. In view of this, it is possible to preview the actual printed works, but checking the layout by previewing the document for all of the records is not practical for the above-described reasons, and thus there has been demand for various types of countermeasures.

Accordingly, a method has been conceived for reducing the number of previews that are displayed. Japanese Patent Laid-Open No. 2005-122727 discloses a method in which the number of previews that are displayed is reduced with use of statistics such as the maximum, minimum, and average size of each region when the actual objects have been disposed in the variable regions. Specifically, pseudo print data is created by disposing maximum size, minimum size, and average size objects, and using the obtained print data as preview and proof output. Also, Japanese Patent Laid-Open No. 2005-216183 discloses that in the preview function of the VDP application, the number of previews that are displayed is reduced by searching for records that have a large difference from a certain designated record, and setting the designated records and the found record as preview targets.

However, in Japanese Patent Laid-Open Nos. 2005-122727 and 2005-216183, all of the variable regions are targets for previewing, and therefore if a large number of data pieces can be set for the variable regions, the number of previews to be displayed becomes large. Also, processing for referencing the database is performed in the display of previews, and therefore the processing load increases as the number of previews to be displayed increases.

SUMMARY OF THE INVENTION

An aspect of the present invention is to eliminate the above-mentioned problems with the conventional technology.

The present invention provides a document processing apparatus and a preview display method that sufficiently reduce the number of previews that are displayed and furthermore suppress an increase in processing.

The present invention in its first aspect provides a document processing apparatus that displays a preview of document data including a region in which an object is inserted, comprising an input unit configured to receive an input of the document data in which a rule for retrieving an object from a database has been specified for each region; a count unit configured to, for each region, count the number of times that the database is referenced for retrieving the object by applying the rule; a comparison unit configured to compare a reference value and each of the number of times counted by the count unit; a determination unit configured to, for each region, determine that the object is to be inserted in the region if a result of the comparison performed by the comparison unit is that the number of times is less than or equal to the reference value, and that the object is not to be inserted in the region if a result of the comparison is that the number of times is greater than the reference value; and a display unit configured to display a preview of the document data with, for each region, the object being inserted in the region or the object not being inserted in the region in accordance with the determination made by the determination unit.

The present invention in its second aspect provides a preview display method executed in a document processing apparatus that displays a preview of document data including a region in which an object is inserted, comprising the steps of receiving an input of the document data in which a rule for retrieving an object from a database has been specified for each region; counting, for each region, the number of times that the database is referenced for retrieving the object by applying the rule; comparing a reference value and each of the number of times counted in the counting step; determining, for each region, that the object is to be inserted in the region if a result of the comparison performed in the comparing step is that the number of times is less than or equal to the reference value, and that the object is not to be inserted in the region if a result of the comparison is that the number of times is greater than the reference value; and displaying a preview of the document data with, for each region, the object being inserted in the region or the object not being inserted in the region in accordance with the determination made in the determining step.

The present invention in its third aspect provides a storage medium storing a preview display program executed in a document processing apparatus that displays a preview of document data including a region in which an object is inserted, the program causing the document processing apparatus to execute the steps of receiving an input of the document data in which a rule for retrieving the object from a database has been specified for each region; counting, for each region, the number of times that the database is referenced for retrieving the object by applying the rule; comparing a reference value and each of the number of times counted in the counting step; determining, for each region, that the object is to be inserted in the region if a result of the comparison performed in the comparing step is that the number of times is less than or equal to the reference value, and that the object is not to be inserted in the region if a result of the comparison is that the number of times is greater than the reference value; and displaying a preview of the document data with, for each region, the object being inserted in the region or the object not being inserted in the region in accordance with the determination made in the determining step.

The present invention enables sufficiently reducing the number of previews that are displayed, and furthermore suppressing an increase in processing.

Further features of the present invention will become apparent from the following description of an exemplary embodiment with reference to the attached drawings.

DESCRIPTION OF THE EMBODIMENTS

A preferred embodiment of the present invention will now be described hereinafter in detail, with reference to the accompanying drawings. It is to be understood that the following embodiment is not intended to limit the claims of the present invention, and that not all of the combinations of the aspects that are described according to the following embodiment are necessarily required with respect to the means to solve the problems according to the present invention. Note that the same reference numerals have been given to constituent elements that are the same, and redundant descriptions thereof will not be given.

Figure 1:
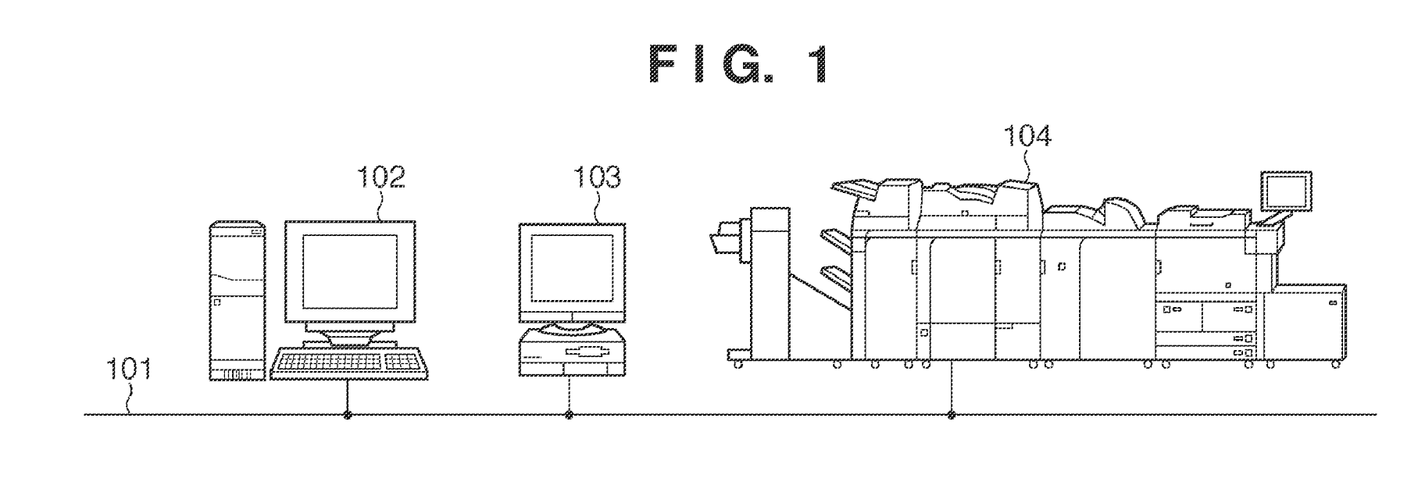
FIG. 1 is a diagram showing an overall configuration of a VDP system according to an embodiment of the present invention.

FIG. 1 is a diagram showing a configuration of a VDP system according to an embodiment of the present invention. The VDP system includes a database server 102, a client PC 103, and a digital printer 104, which are connected via a network 101. Data can be read from and written to the database server 102 via the network 101. The client PC 103 generates VDP data with use of data acquired from the database server 102, and transmits the VDP data to the digital printer 104. The digital printer 104 prints the received VDP data. In the present embodiment, the database server 102 and the client PC 103 are network-connected. Here, the database server 102 may be implemented as a so-called cloud service on the Internet, or the database server 102 and the client PC 103 may be the same computer. The database server 102 and the client PC 103 are described below as an example of a document processing apparatus of the present embodiment.

Figure 2:
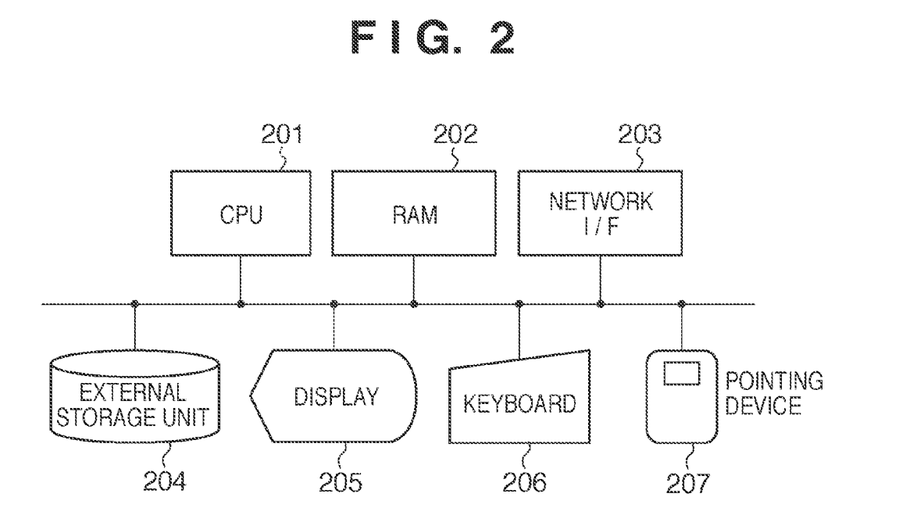
FIG. 2 is a diagram showing a configuration of a database server and a client PC.

FIG. 2 is a block diagram showing an example of a configuration of the database server 102 and the client PC 103. A CPU 201 performs control of the whole of the document processing apparatus in accordance with a control program stored in a RAM 202. The RAM 202 stores the document processing apparatus control program executed by the CPU 201 and data such as document images. Under control of the CPU 201, a network interface 203 establishes connections to the network and transmits and receives data and the like. An external storage unit 204 is a magnetic disk, for example, and saves data. A display 205 is an example of a display unit, and a keyboard 206 and a pointing device 207 are examples of input units. Programs stored in the RAM 202 use, as necessary, functions of an OS that is similarly stored in the RAM 202, in order to perform predetermined operations. Also, the programs stored in the RAM 202 read and write the content of data from and to the RAM 202, read and write data from and to the external storage unit 204, and transmit and receive data via the network interface 203. Furthermore, the programs stored in the RAM 202 receive input from the keyboard 206 or the pointing device 207, and display data on the display 205.

In the database server 102, a database is configured in the external storage unit 204. If a database program stored in the RAM 202 of the database server 102 receives an instruction to read/write data from/to a database via the network interface 203, the CPU 201 of the database server 102 executes the instruction. After the instruction has been executed, the result is transmitted as a reply via the network interface 203.

In the client PC 103, a VDP application stored in the RAM 202 of the client PC 103 receives input from the keyboard 206 or the pointing device 207, and creates VDP data in the RAM 202. If the VDP application receives a print instruction from the keyboard 206 or the pointing device 207, the VDP application transmits the VDP data to the digital printer 104 via the network interface 203.

Figure 3:
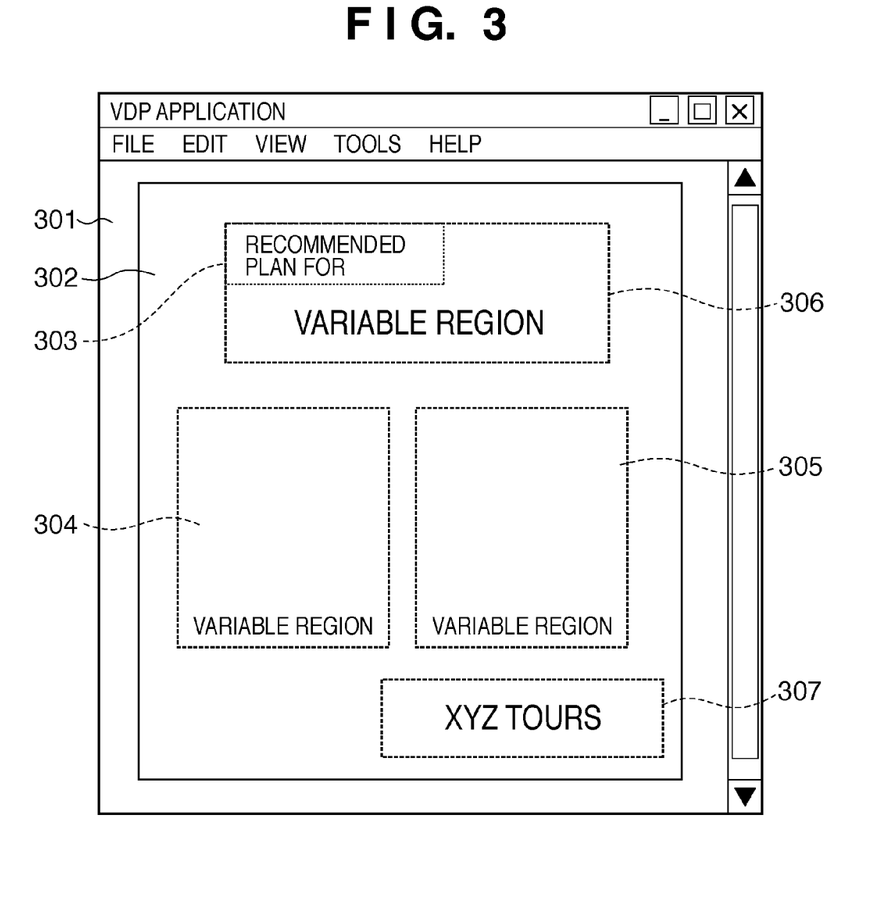
FIG. 3 is a diagram showing an example of a user interface of a VDP application.

FIG. 3 is a diagram showing an example of a user interface for editing VDP data (document data) using the VDP application. The VDP application displays a document area 302 that indicates document boundaries in an editing area 301, receives user input, arranges regions for disposing objects in the document area, and creates VDP data. In FIG. 3, five regions 303 to 307 are disposed. The regions 303 to 305 are variable regions in which objects (e.g., text or images) that differ for each record are inserted in accordance with the content of the database. Accordingly, the objects that are actually to be printed are not displayed in the variable regions in the preview screen, but rather only the positions of the variable regions are displayed to the user. The regions 306 and 307 are fixed regions in which the same object is disposed. Accordingly, the actual objects are disposed in these regions even in the preview screen.

As described above, unique information is set in the variable regions such that different objects are inserted therein. This unique information is mainly rules for determining which objects are to be disposed in the variable regions, and one example of the unique information is a conditional expression for referencing fields in the database.

Figure 4:
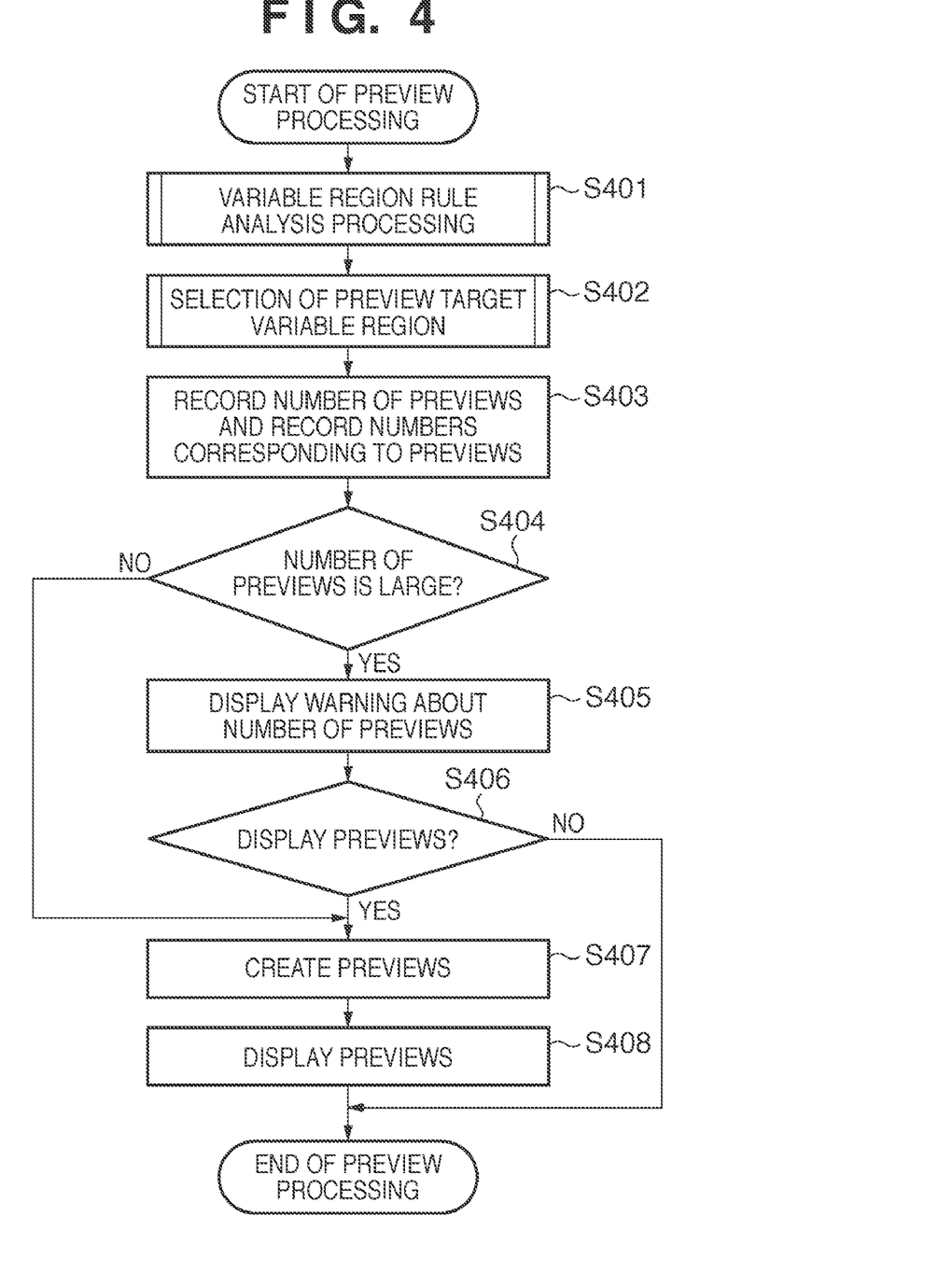
FIG. 4 is a flowchart showing a procedure of preview processing according to the embodiment.

Next is a description of preview display processing performed by the VDP application of the present embodiment with reference to FIG. 4. Note that the flowcharts in this description are realized by the CPU 201 reading out programs necessary for executing the flowcharts from a memory, and executing the programs.

FIG. 4 is a flowchart showing a procedure of preview display processing performed by the VDP application. If the VDP application receives user input and preview processing starts, firstly the rule for each variable region is analyzed (S401). The result of this analysis is used as information for selecting variable regions where inserted objects are to be displayed during previewing (hereinafter, referred to as "preview target variable regions"). Next, the VDP application selects preview target variable regions based on the analysis result (S402). Thereafter, the VDP application records the number of previews to be displayed, which is determined by applying the data in each record of the database in the selected variable regions, and also records the database record numbers that correspond to each preview (S403).

Next, the VDP application compares the recorded number of previews to be displayed with a predetermined reference value (S404). If the number of previews to be displayed is greater than the reference value, the VDP application displays a warning screen on the display 205 (S405). This is performed in order to ask the user whether to continue processing since if the number of previews to be displayed is large, it becomes impossible to achieve the original object of checking the layout by displaying as few previews as possible. While the warning screen is displayed, the VDP application receives an instruction indicating whether to continue processing (S406). On the other hand, if the number of previews to be displayed is less than or equal to the reference value, the VDP application proceeds to the processing of S407.

The VDP application creates preview screens in which objects have been inserted in only the variable regions selected in S402 (S407), and displays the created preview screens (S408). In general, a plurality of preview screens are created, and therefore the preview screens are displayed as a slideshow or as thumbnails.

Figure 5:
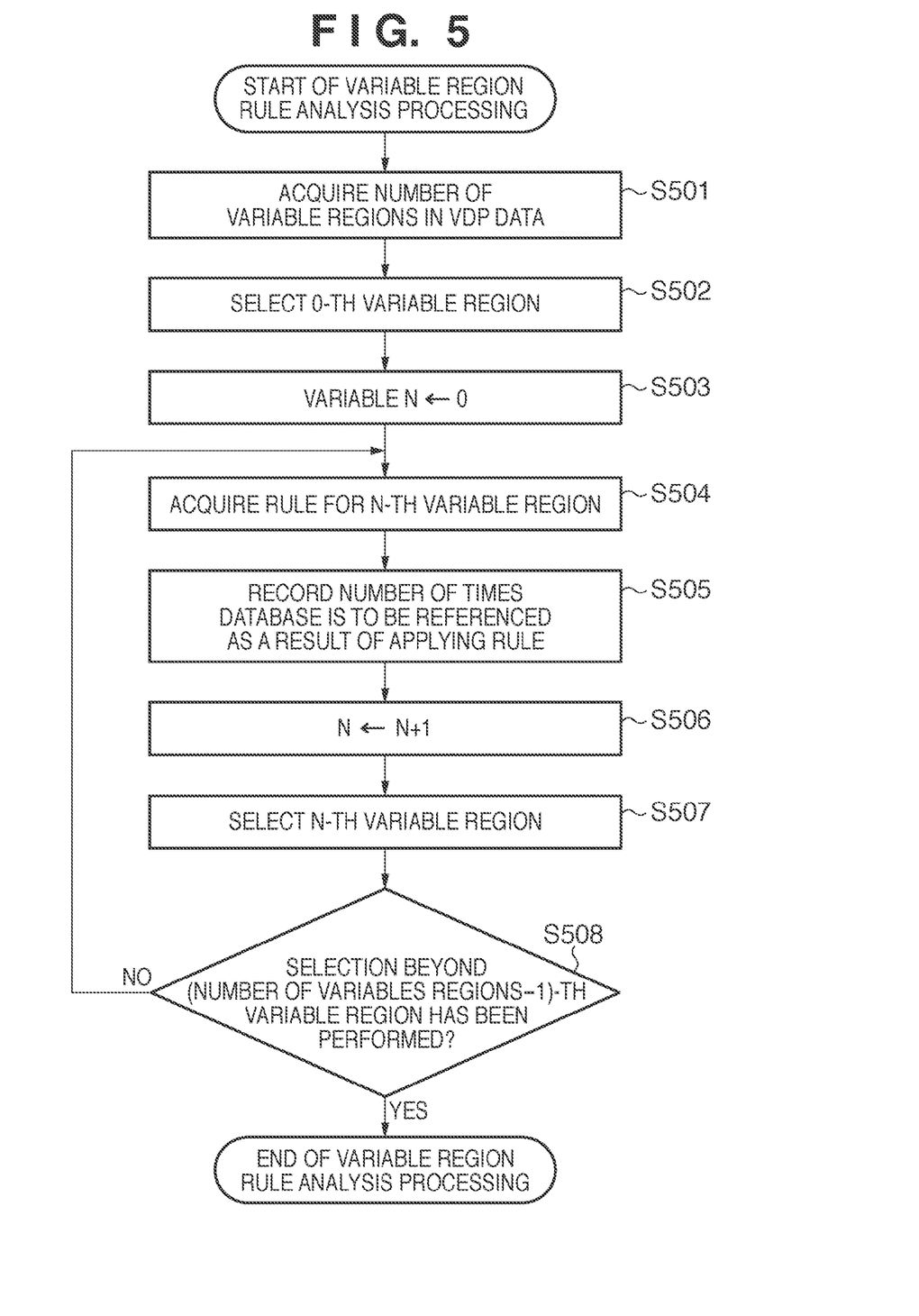
FIG. 5 is a flowchart showing a procedure of processing in S401 in FIG. 4.

FIG. 5 is a flowchart showing a procedure of the processing in S401 shown in FIG. 4. First, the VDP application acquires the number of variable regions in the VDP data targeted for processing (S501). For N-th (N being from 0 to (number of variable regions−1)) variable regions, the VDP application then acquires a rule for determining the object to be disposed (object determination rule) (S502 to S504, S506 to S508). Based on the result of applying the rule, the VDP application records (counts) the number of times that database fields are to be referenced for each variable regions (S505). In the present embodiment, the variable N is provided and incremented, and thus the number of times that database fields are to be referenced is recorded for the 0-th to (number of variable regions−1)-th variable regions.

The following is a detailed description of S505. For each variable region in the VDP data, a rule is set for determining which object is to be disposed in the variable region. In general, the object to be disposed in the variable region is determined with use of, for example, a calculation, a numerical comparison, or conditional branching with respect to field values in the database. The value recorded based on this analysis in S505 is the number of times that field values of the database records are to be referenced as a result of applying the rule.

Figure 6A:
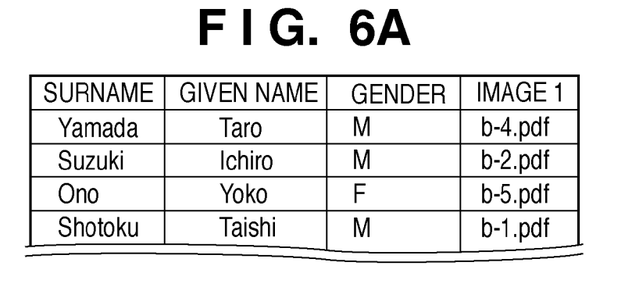
FIGS. 6A, 6B, 6C, and 6D are diagrams showing an example of a database and rules for referencing the database.
Figure 6B:
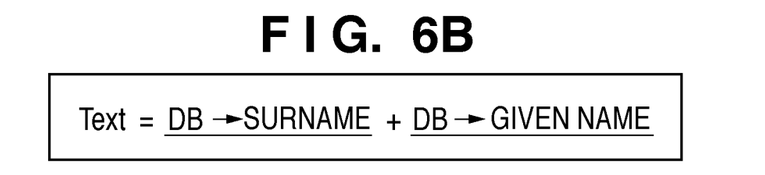
Figure 6C:
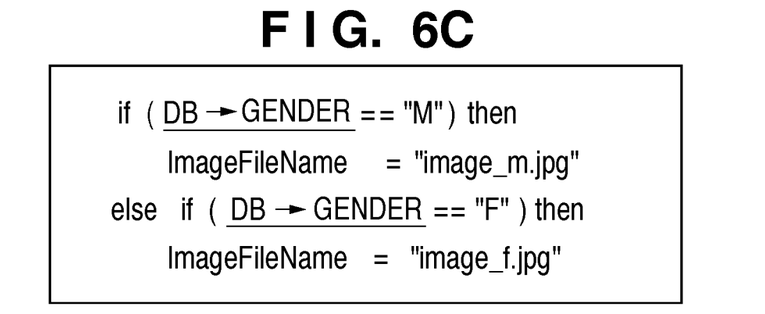
Figure 6D:
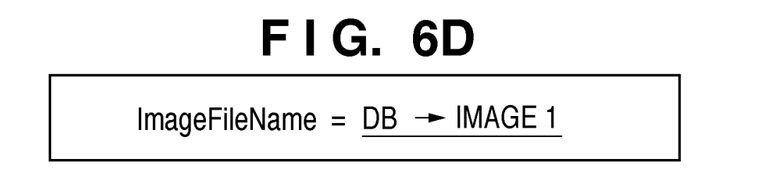

For example, consider the case in which the database shown in FIG. 6A is applied to the VDP data shown in FIG. 3. Assume that the rules shown in FIGS. 6B, 6C, and 6D have been set for the variable regions 303 to 305 respectively. The rule set for the variable region 303 (FIG. 6B) is a rule indicating that the character string to be displayed in this region is a concatenated character string including a character string in a "surname" field and a character string in a "given name" field. In this case, applying this rule means that the number of times database field values are to be referenced is "2". Also, there are cases where a database field value is not referenced even when a rule is applied. The rule for the variable region 304 (FIG. 6C) is a rule for disposing an image having the filename "image_m.jpg" if "M" is indicated in a "gender" field, and disposing an image having the filename "image_f.jpg" if "F" is indicated in the "gender" field. In this case, database field values are not referenced even when this rule is applied, and therefore the number of times the database is to be referenced is "0". The thus-obtained information indicating the number of times database fields are to be referenced for the variable region is held for each variable region as a structure such as that shown in FIG. 7.

Figure 7:
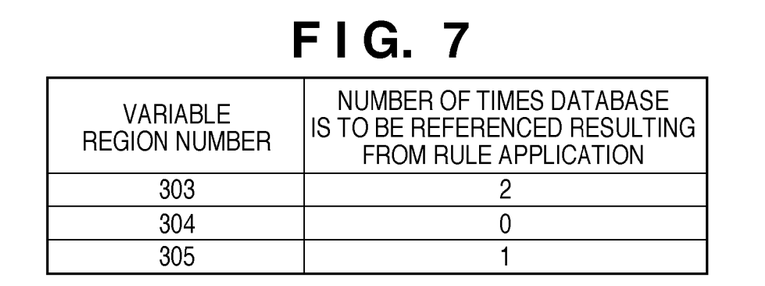
FIG. 7 is a diagram showing a table associating variable regions and numbers of times the database is to be referenced.
Figure 8:
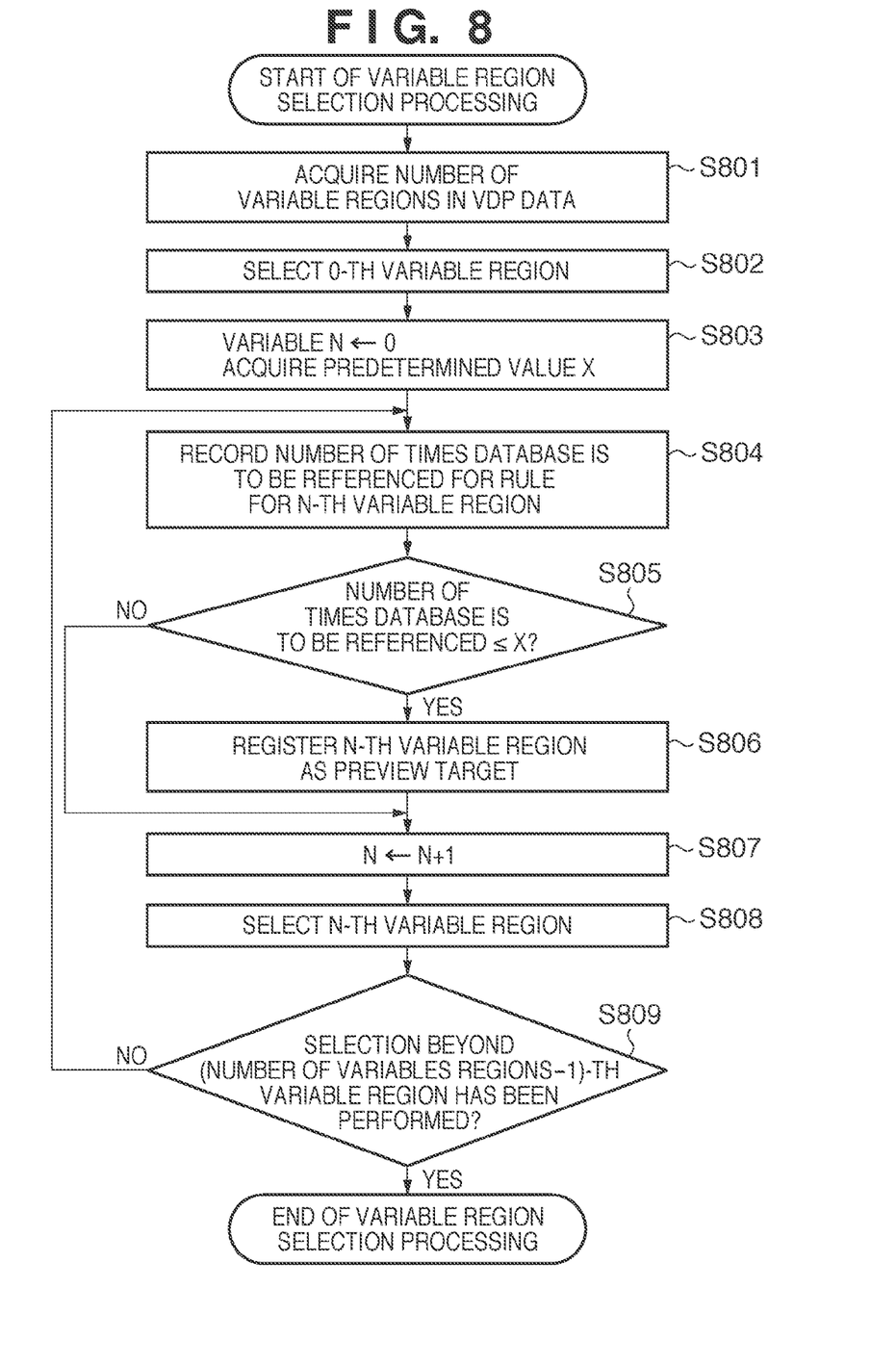
FIG. 8 is a flowchart showing a procedure of processing in S402 in FIG. 4.

FIG. 8 is a flowchart showing a procedure of processing in S402 shown in FIG. 4. Firstly, the VDP application acquires the number of variable regions in the VDP data targeted for processing (S801). Then, for the N-th (N being from 0 to (number of variable regions−1)) variable region, the VDP application acquires the number of times the database is to be referenced for the variable region from the structure shown in FIG. 7 that was created in the rule analysis processing shown in FIG. 5 (S802, S803, S804, and S807 to S809). Next, the VDP application determines whether the acquired value (reference count) is less than or equal to a predetermined value x (S805), and if the acquired value is less than or equal to the predetermined value x, the VDP application registers the variable region as a preview target variable region (S806).

The predetermined value x acquired in S803 may be a value that the VDP application holds in advance as a setting value. In order to achieve this, the VDP application may, for example, hold a default value and load the default value as the value of x when the VDP application starts. Also, a configuration is possible in which the value can be changed upon receiving user input after the value has been loaded.

The following describes a specific example of the processing shown in FIG. 8. Consider the case where the VDP application performs the processing shown in FIG. 8 with use of the VDP data shown in FIG. 3, the database and rules shown in FIGS. 6A to 6D, and the structure information shown in FIG. 7 obtained as a result of perform processing for analyzing the rules for the variable regions. If the VDP application has set "1" as the value of the predetermined value x, the VDP application selects, as preview target variable regions, the variable regions 304 and 305 for which the result of rule application is that the number of times the database is to be referenced is less than or equal to 1.

The processing in S403 shown in FIG. 4 is processing for obtaining patterns in which objects have been inserted in only the preview target variable regions selected in S402. The information obtained in this way is held as a structure such as that shown in FIG. 9.

Figure 9:
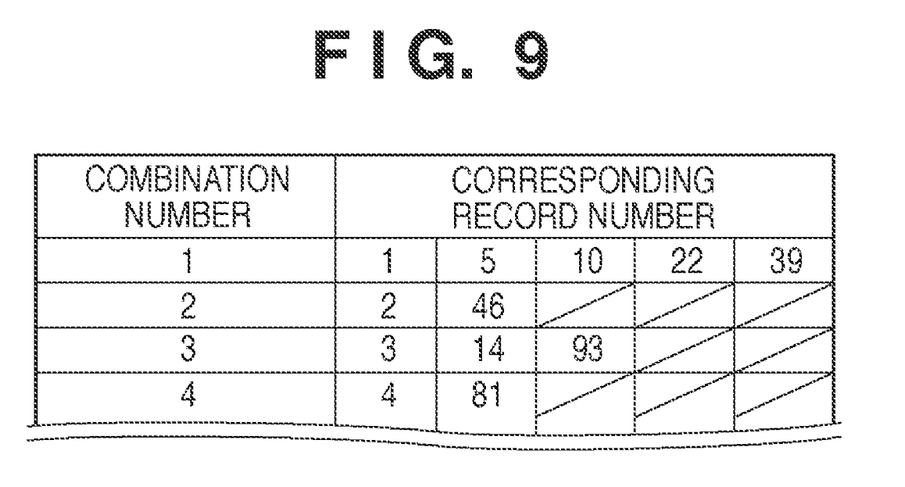
FIG. 9 is a diagram showing a structure associating preview patterns and record numbers.

Lastly, preview screens for the patterns are created, and the preview screens are displayed along with the database record numbers corresponding to the patterns as a slideshow. Here, the VDP application creates only previews corresponding to these patterns based on the information created in S403 (FIG. 9). For this reason, the previews for the patterns are created by applying the rules for the preview target variable regions to only corresponding records among the records that correspond to the plurality of patterns.

Figure 10A:
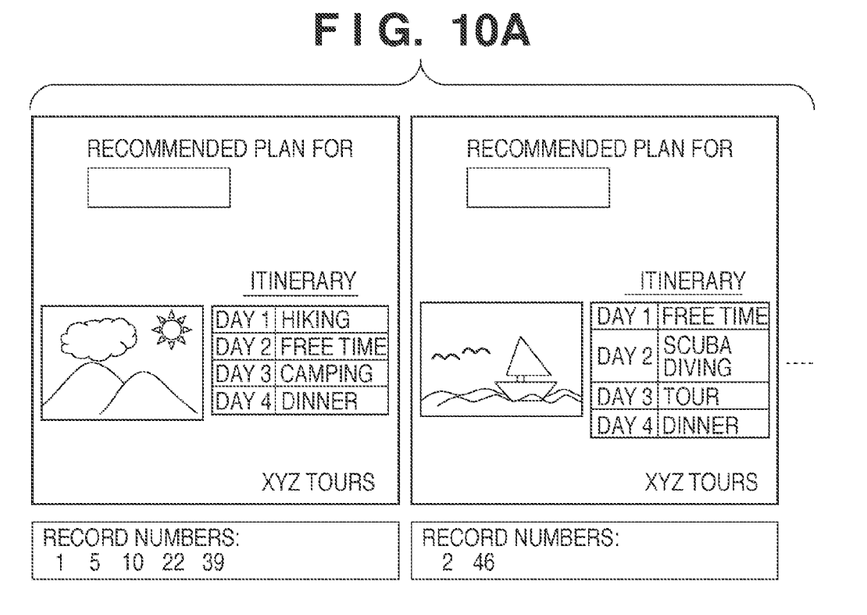
FIGS. 10A and 10B are diagrams showing examples of preview display.
Figure 10B:
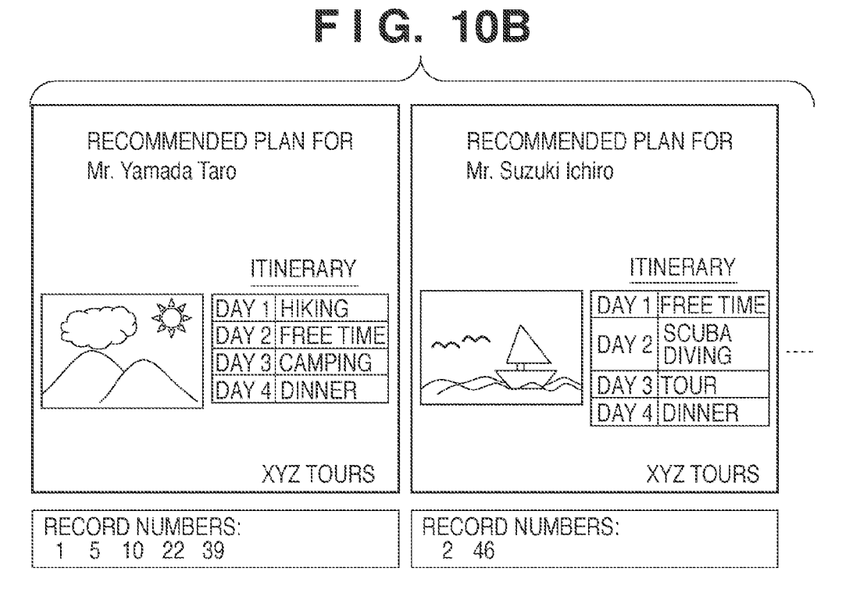

When displaying previews, preview screens in which actual objects have been inserted in only the fixed regions and the variable regions selected in S402 are displayed, as shown in FIG. 10A. Also, as shown in FIG. 10B, preview screens may be displayed in which, for each variable region not selected in S402, the object in the first record among the records for the pattern has been inserted in the variable region. For example, the preview screen shown on the left side in FIG. 10A corresponds to a combination number 1 (pattern 1). The combination number 1 corresponds to a preview screen for records 1, 5, 10, 22, and 39. With conventional technology, five types of patterns would be targeted for display since the name data is different in each of these records, but with the present invention, the name data is ignored, thus enabling consolidating the five types of patterns into one pattern. As a result, it is possible to reduce the number of patterns that are displayed.

As described above, in the present embodiment it is possible to determine preview target variable regions by merely analyzing rules for variable regions. With this method, there is no need to reference database records, of which there may be several thousands to several tens of thousands, thus preventing the load of processing at this stage from becoming large. Even when this method is used, it is possible for the number of preview patterns created as a result to become extremely large. The following can be considered to be causes for this.

(1) The number of variable regions targeted for previewing as a result of the processing shown in FIG. 8 is excessively large.

(2) The number of patterns obtained when database records have been applied to the variable regions targeted for previewing as a result of the processing shown in FIG. 8 is excessively large.

In view of this, measures are provided for addressing each of these causes. Firstly, the first cause is, in other words, the case where the number of variable regions obtained as the result of the determination in S805 in FIG. 8 is large. In view of this, the first cause can be addressed by increasing the number of variable regions that do not pass the determination by making the determination in S805 stricter. For example, the number of variable regions obtained as a result of the determination in S805, that is to say, the number of variable regions targeted for previewing can be adjusted by lowering the value of the predetermined value x.

Next, the second cause can be addressed by excluding, from among the variable regions targeted for previewing, a portion of the variable regions based on the number of patterns obtained when all of the records in the database have actually been applied. In order to achieve this, firstly, for each of the preview target variable regions resulting from the processing shown in FIG. 8, the number of rendering patterns obtained when all of the records in the database have actually been applied is obtained. Next, if the number of rendering patterns is greater than a predetermined value (indicated by y) that has been designated by the user, the variable region is excluded from being a preview target.

Figure 11:
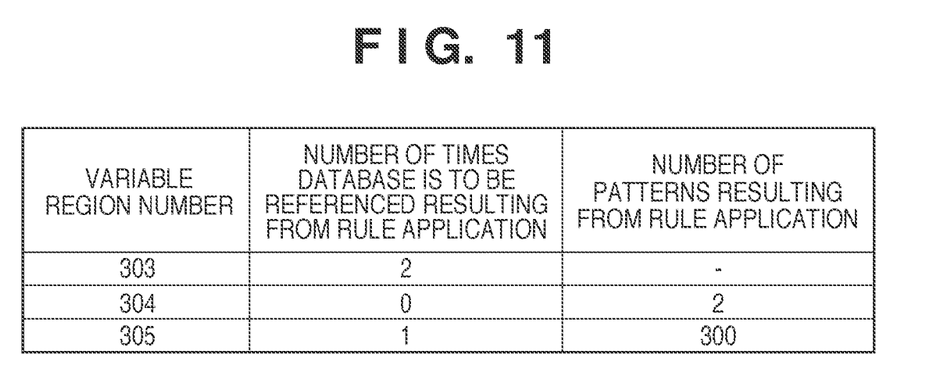
FIG. 11 is a diagram showing a table associating variable regions and numbers of patterns resulting from rule application.

FIG. 11 shows an example of a format in which the number of rendering patterns obtained when all of the records in the database have actually been applied has been added to the table shown in FIG. 7. In this example, the "number of times database is to be referenced resulting from rule application" for the variable region 305 is "1", which is small, but the "number of patterns resulting from rule application" is "300", which is large. If the variable regions 304 and 305 are determined to be preview target variable regions, the "number of patterns resulting from rule application" is "2" and "300" respectively, and therefore the maximum number of previews that would be created would be the result of multiplying these values (i.e., 2×300=600 patterns). Here, if the value of y is set to "100", for example, the variable region 305 can be excluded from the preview targets. If the variable region 305 is excluded from the preview targets, only the variable region 304 is targeted for previewing, and therefore two patterns of previews are created, thus greatly reducing the number of previews that are displayed.

The present invention can also be realized by executing the following processing. Specifically, this processing is processing in which software (a program) that realizes the functions of the above-described embodiment is supplied to a system or an apparatus via a network or any of various types of storage media, and a computer in the system or a computer in the apparatus (or a CPU, MPU, or the like) reads out and executes the program.

Other Embodiments

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-243782, filed on Oct. 22, 2009, which is hereby incorporated by reference herein in its entirety.

What is claimed is:

1. A document processing apparatus that displays a preview of document data including a region in which an object is inserted, comprising:
 a memory;
 an input unit configured to input the document data in which a rule has been specified for a first region and a second region, wherein the rule is used for retrieving the object from a data base;
 a count unit configured to count a first number of times in which the database is referred to retrieve the object for the first region and a second number of times in which the database is referred to retrieve the object for the second region, based on the rule; and
 a display unit configured to display a preview of the document data in which the object is inserted in the first region and the object is not inserted in the second region, in a case where the first number of times is less than or equal to a predetermined value and the second number of times is greater than the predetermined value.

2. The apparatus according to claim 1, wherein the display unit displays the preview of the document data and a record number corresponding to the preview of the document data, wherein the record number represents a combination of objects that are inserted to regions included in the document data.

3. The apparatus according to claim 1, wherein the display unit displays, as a blank area, the second region in which the object is not inserted.

4. A preview display method executed in a document processing apparatus that displays a preview of document data including a region in which an object is inserted, comprising the steps of:
 inputting the document data in which a rule has been specified for a first region and a second region, wherein the rule is used for retrieving the object from a data base;
 counting a first number of times in which the database is referred to retrieve the object for the first region and a second number of times in which the database is referred to retrieve the object for the second region, based on the rule; and
 displaying a preview of the document data in which the object is inserted in the first region and the object is not inserted in the second region, in a case where the first number of times is less than or equal to a predetermined value and the second number of times is greater than the predetermined value.

5. The method according to claim 4, wherein the display step displays the preview of the document data and a record number corresponding to the preview of the document data, wherein the record number represents a combination of objects that are inserted to regions included in the document data.

6. The method according to claim 4, wherein the display step displays, as a blank area, the second region in which the object is not inserted.

7. A non-transitory computer-readable storage medium storing a preview display program executed in a document processing apparatus that displays a preview of document data including a region in which an object is inserted, the program causing the document processing apparatus to execute the steps of:
 inputting the document data in which a rule has been specified for a first region and a second region, wherein the rule is used for retrieving the object from a data base;
 counting a first number of times in which the database is referred to retrieve the object for the first region and a second number of times in which the database is referred to retrieve the object for the second region, based on the rule;
 displaying a preview of the document data in which the object is inserted in the first region and the object is not inserted in the second region, in a case where the first number of times is less than or equal to a predetermined value and the second number of times is greater than the predetermined value.

8. The non-transitory computer-readable storage medium according to claim 7, wherein the display step displays the preview of the document data and a record number corresponding to the preview of the document data, wherein the record number represents a combination of objects that are inserted to regions included in the document data.

9. The non-transitory computer-readable storage medium according to claim 7, wherein the display step displays, as a blank area, the second region in which the object is not inserted.

* * * * *